United States Patent

Shiga et al.

[11] Patent Number: 5,205,582
[45] Date of Patent: Apr. 27, 1993

[54] OCCUPANT PROTECTIVE SYSTEM

[75] Inventors: Masayuki Shiga; Makie Morata, both of Wako, Japan

[73] Assignee: Honda Giken Kogyo Kabushiki Kaisha, Tokyo, Japan

[21] Appl. No.: 750,168

[22] Filed: Aug. 26, 1991

[30] Foreign Application Priority Data

Sep. 20, 1990 [JP] Japan .................................. 2-98592

[51] Int. Cl.$^5$ ............................................. B60R 21/16
[52] U.S. Cl. ..................................... 280/735; 180/273
[58] Field of Search ............... 280/735, 734, 728, 730, 280/731, 732; 180/268, 273, 282; 340/436; 307/10.1

[56] References Cited

U.S. PATENT DOCUMENTS

| | | | |
|---|---|---|---|
| 3,672,699 | 6/1972 | De Windt | 280/735 |
| 3,767,002 | 10/1973 | Gillund | 280/735 |
| 4,620,721 | 11/1986 | Scholz et al. | 180/268 |
| 5,072,966 | 12/1991 | Nishitake | 280/730 |
| 5,161,820 | 11/1992 | Vollmer | 280/735 |

FOREIGN PATENT DOCUMENTS

| | | | |
|---|---|---|---|
| 2516185 | 10/1975 | Fed. Rep. of Germany | 280/730 |
| 3932417 | 4/1991 | Fed. Rep. of Germany | 280/728 |
| 2-34453 | 2/1990 | Japan | 280/728 |
| 136351 | 5/1990 | Japan | 280/734 |

*Primary Examiner*—Karin L. Tyson
*Attorney, Agent, or Firm*—Armstrong, Westerman, Hattori, McLeland & Naughton

[57] ABSTRACT

An occupant protective system for an automotive vehicle having a driver's seat and an assistant driver's seat. A magnitude of detected deceleration is compared with first and second threshold values, the second threshold value being greater than the first threshold value. If the magnitude of detected deceleration exceeds the second threshold value, both of a first air bag provided for the driver's seat and a second air bag provided for the assistant driver's seat are caused to be inflated even when the assistant driver's seat is not occupied, whereas if the magnitude of detected deceleration exceeds the first threshold value but does not exceed the second threshold value, the first air bag for the driver's seat alone is caused to be inflated when the assistant driver's seat is not occupied.

3 Claims, 2 Drawing Sheets us patent 5,205,582

OCCUPANT PROTECTIVE SYSTEM

BACKGROUND OF THE INVENTION

This invention relates to an occupant protective system for automotive vehicles, and more particularly to an occupant protective system adapted to protect occupants even when the shock upon crash of an automotive vehicle is very large.

As an occupant protective system of this kind, a system is conventionally known, which has air bag devices provided for the driver's seat and the assistant driver's seat of an automotive vehicle, respectively, each of the air bag devices comprising an acceleration sensor for detecting shock upon crash of the vehicle, an inflator (gas generator) which generates a gas in response to a signal indicative of the detected acceleration supplied from the acceleration sensor, and an air bag which is inflated by the gas.

According to this known system, when the vehicle receives shock upon crash thereof, for example, the signal indicative of the detected acceleration is supplied to the inflator, and a squib in the inflator is ignited to generate a nitrogen gas to thereby inflate the air bag, whereby the occupant is protected from hitting against the steering wheel or the windshield.

However, in this occupant protective system, the air bag device provided for the assistant driver's seat is adapted not to operate if there is no occupant in the assistant driver's seat when the vehicle receives shock upon crash thereof etc.

SUMMARY OF THE INVENTION

It is the object of the invention to provide an occupant protective system for an automotive vehicle, which is capable of operating an air bag provided for the assistant driver's seat even when there is no occupant seated in the assistant driver's seat if the shock upon crash of the vehicle etc. is very large, to thereby more safely protect the occupant in the driver's seat.

To attain the above object, the invention provides an occupant protective system for an automotive vehicle having a driver's seat and an assistant driver's seat which includes a first air bag provided for the driver's seat of the vehicle, a second air bag provided for the assistant driver's seat, and deceleration detecting means for detecting a magnitude of deceleration exerted on the vehicle, occupant detecting means for detecting whether or not there is an occupant seated on the assistant driver's seat. The occupant protective system further includes actuator means responsive to an output from the occupant detecting means for causing at least the first air bag to be inflated to absorb shock, when the magnitude of deceleration detected by the deceleration detecting means exceeds a predetermined value.

The actuator means of the occupant protective system according to the invention is includes comparison means for comparing the magnitude of deceleration detected by the deceleration detecting means with first and second threshold values forming the predetermined value, the second threshold value being greater than the first threshold value.

The actuator means of the occupant protective system further includes selecting means responsive to outputs from the comparison means and the occupant detecting means for causing both of the first and second air bags to be inflated even when no occupant is seated on the assistant driver's seat, if the magnitude of deceleration detected exceeds the second threshold value, and for causing the first air bag alone to be inflated when no occupant is seated on the assistant driver's seat, if the magnitude of deceleration detected exceeds the first threshold value and does not exceed the second threshold value.

Preferably, the comparison means comprises a first comparator for comparing the magnitude of deceleration detected with the first threshold value, and a second comparator for comparing the magnitude of deceleration detected with the second threshold value, and the selecting means comprises an AND circuit having one input supplied with an output from the first comparator and another input supplied with an output from the occupant detecting means, and an OR circuit having one input supplied with an output from the second comparator and another input supplied with an output from the AND circuit.

More preferably, the occupant detecting means has a switch provided at the assistant driver's seat for detecting an occupant seated thereon.

The term "deceleration" used throughout the present specification means both its proper meaning, i.e. deceleration and acceleration, since a deceleration sensor used in the system of the invention many also be used as an acceleration sensor depending upon the direction in which it is mounted, the design of a signal processing circuit of the actuator system, etc.

The above and other objects, features, and advantages of the invention will become more apparent from the ensuing detailed description taken in conjunction with the accompanying drawings.

DETAILED DESCRIPTION

The invention will now be described in detail with reference to the drawings showing an embodiment thereof.

Figure 1:
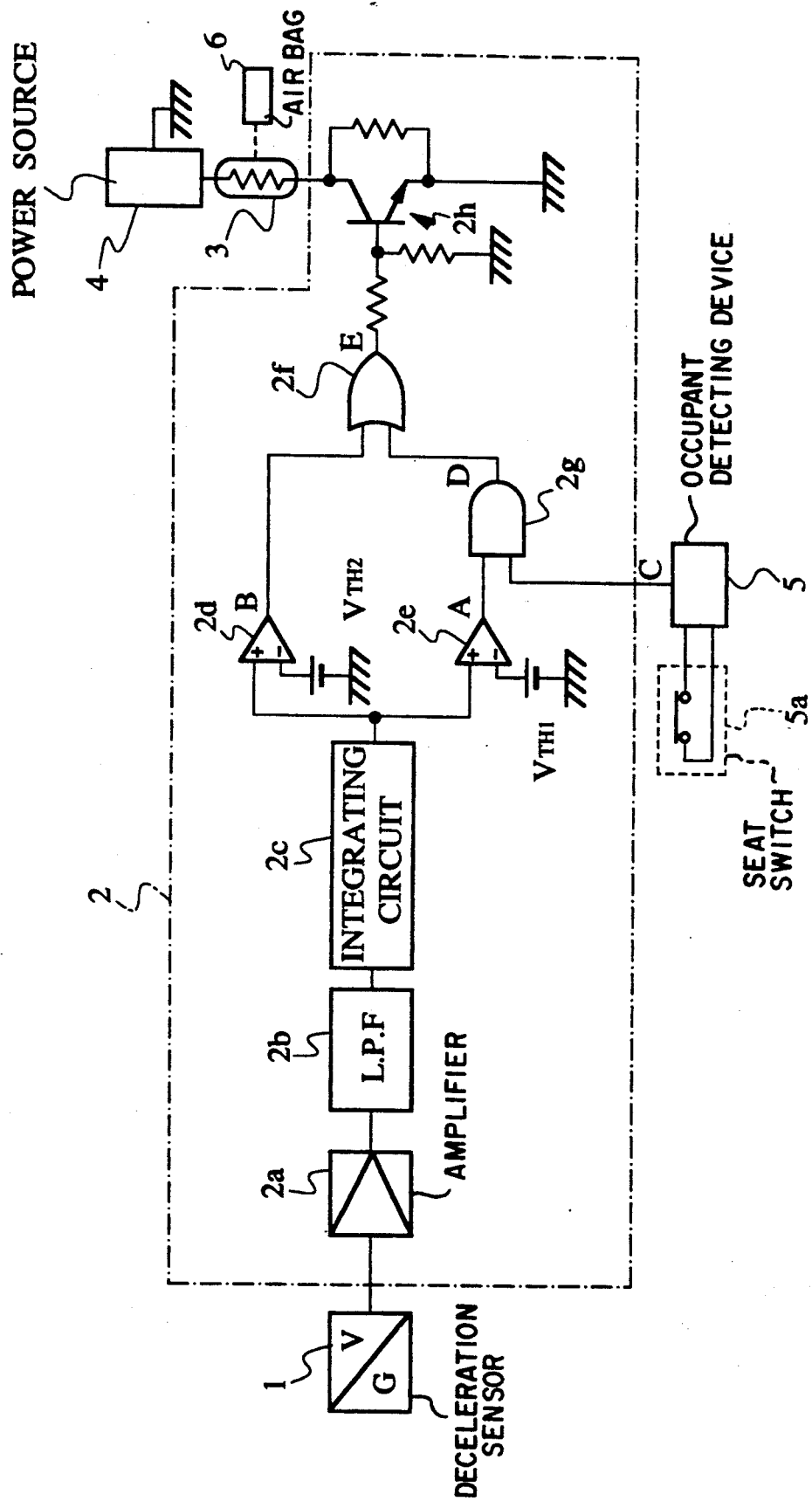
FIG. 1 is a block diagram showing the arrangement of an actuator system of an occupant protective system according to an embodiment of the invention.

FIG. 1 shows the arrangement of an actuator system of an occupant protective system according to the embodiment. In the figure, there is shown an actuator system of the occupant protective system for an air bag of same provided for the assistant driver's seat. The following description will refer to this actuator system alone, and drawings and description of an actuator system for an air bag provided for the driver's seat are omitted. The actuator system of the occupant protective system mainly comprises a deceleration sensor I for detecting deceleration acting on the vehicle, a deceleration signal-processing circuit 2 for evaluating a signal indicative of the detected deceleration supplied from the deceleration sensor 1, a squib 3 responsive to output from the deceleration signal-processing circuit 2 for actuating an air bag 6 and a power source 4 for feeding electricity to the squib 3.

Connected to the deceleration signal-processing circuit 2 is an occupant detecting device 5 having a seat switch 5a formed e.g. of a piezo-electric element. The occupant detecting device 5 generates a signal when an occupant is seated in the assistant driver's seat. The deceleration signal-processing circuit 2 includes an amplifier 2a the input side of which is connected to the deceleration sensor 1, and the output side is connected to comparators 2d, 2e via a low-pass filter 2b and an integrating circuit 2c. The comparator 2d is directly connected to an OR circuit 2f, whereas the comparator 2e is connected to the OR circuit 2f via an AND circuit 2g. Further, also connected to the input side of the AND circuit 2g is the occupant detecting device 5. The OR circuit 2f is connected to the base of a transistor 2h, and the squib 3 is connected to the collector of same. A first threshold voltage $V_{TH1}$ is supplied to an inverting input terminal of the comparator 2e, while a second threshold voltage $V_{TH2}$ higher than the first threshold voltage $V_{TH1}$ is supplied to an inverting input terminal of the comparator 2d. The comparator 2e generates a high level output when voltage higher than the first threshold voltage $V_{TH1}$ is supplied thereto from the integrating circuit 2c, while the comparator 2d generates a high level output when voltage higher than the second threshold voltage $V_{TH2}$ is supplied thereto from same.

The integrating circuit 2c integrates the signal indicative of the detected deceleration supplied thereto from the deceleration sensor 1 via the amplifier 2a and the low-pass filter 2b, and supplies voltage higher than a predetermined value to the comparators 2d, 2e only when shock having a predetermined or larger magnitude acts on the deceleration sensor 1 over a predetermined time period.

The operation of the thus constructed occupant protective system according to the invention will be described with reference to the timing chart shown in FIG. 2. The symbols A, B, C, D, and E appearing in FIGS. 1 and 2 indicate levels of outputs from the comparator 2e, the comparator 2d, the occupant detecting device 5, the AND circuit 2g, and the OR circuit 2f, respectively.

If deceleration having a magnitude equal to or higher than a predetermined value is exerted on the deceleration sensor 1, the sensor 1 generates and supplies a signal indicative of the detected deceleration to the deceleration signal-processing circuit 2. The signal is amplified by the amplifier 2a, and has its high frequency components removed by the low-pass filter 2b. Then, the signal is integrated by the integrating circuit 2c, which supplies output voltage to the comparators 2d, 2e.

Figure 2:
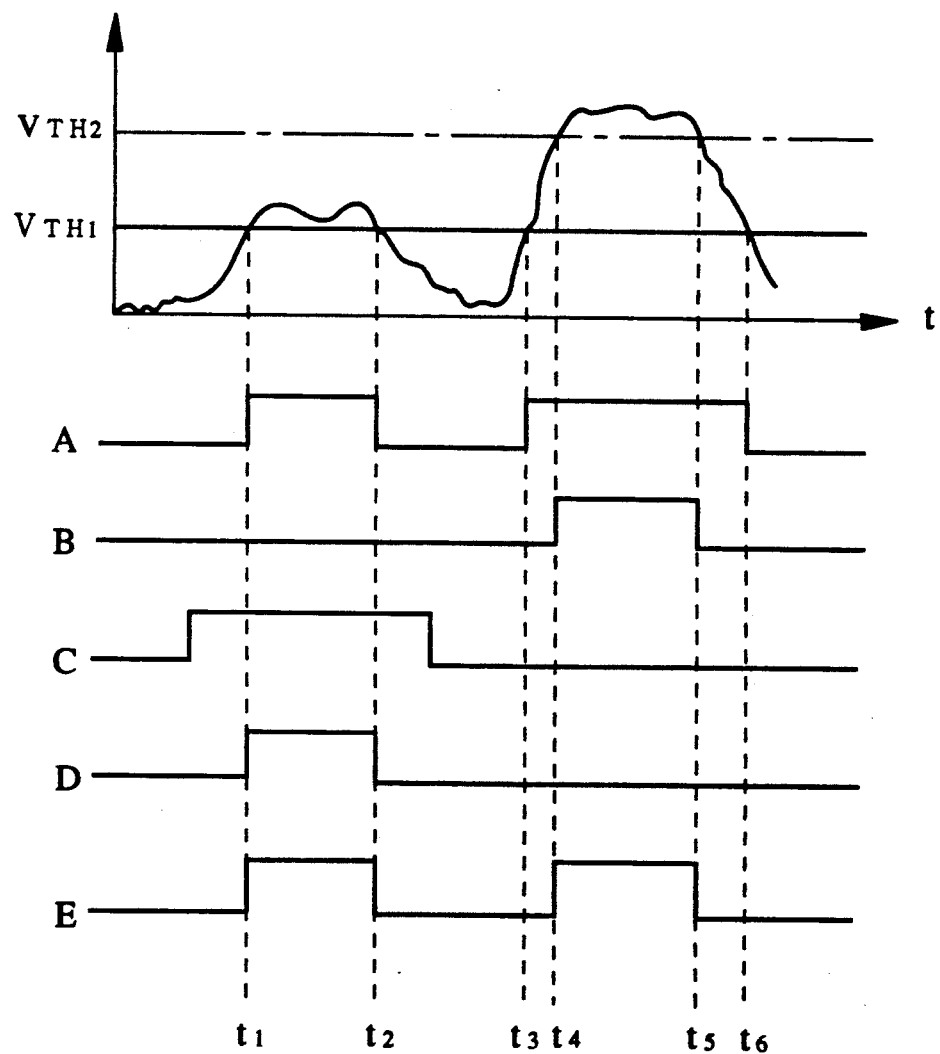
FIG. 2 is a timing chart showing levels of outputs from various component parts appearing in FIG. 1.

When the output voltage from the integrating circuit 2c assumes a value higher than the first threshold value $V_{TH1}$ and equal to or lower than the second threshold value $V_{TH2}$, the comparator 2d does not generate a high level output (as indicated by B of FIG. 2). On the other hand the other comparator 2e operates in response to output from the integrating circuit 2c to generate a high level output (as indicated by A of same). On this occasion, if the assistant driver's seat is occupied, the seat switch 5a is closed, so that a high level signal indicative of detection of the occupant is supplied from the occupant detecting device 5 to the AND circuit 2g (as indicated by C f same). Accordingly, the AND circuit 2g generates a high level output (as indicated by D of same), which is supplied to the OR circuit 2f. Then the OR circuit 2f generates a high level output (as indicated by E of same), which is supplied to the transistor 2h to turn it on, whereby electric current is supplied from the power source 4 to the squib 3. The squib 3 is heated to force nitrogen gas into the air bag 6, so that the air bag 6 is inflated to prevent the occupant from hitting against the windshield ($t_1$ to $t_2$ in FIG. 2).

In contrast, when there is no occupant seated on the assistant driver's seat in the above case, the signal indicative of detection of the occupant is not supplied to the AND circuit 2g, and hence the output from the AND circuit 2g remains low. Accordingly, the transistor 2h is not turned on, so that the squib 3 is not heated and hence the air bag is not inflated. On this occasion, the air bag for the driver's seat is inflated by the other actuator system, to thereby prevent the driver from hitting against the steering wheel etc.

Next, when the output voltage from the integrating circuit 2c exceeds the second threshold value $V_{TH2}$, the both comparators 2d, 2e operate, and the comparator 2d supplies a high level output to the OR circuit 2f (as indicated by B of FIG. 2, at $t_4$ to $t_5$. At the same time, the high level output from the comparator 2e is supplied to the AND circuit 2g (as indicated by A of FIG. 2, at $t_3$ to $t_6$), the output from which is dependent on whether the signal indicative of detection of the occupant is supplied thereto from the occupant detecting device 5. However, as mentioned as above, the high level output from the comparator 2d is supplied to the OR circuit 2f, which in turn supplies the high level output to the base of the transistor 2h, so that the transistor 2h is turned on irrespective of the level of output from the AND circuit 2g, to thereby actuate the squib 3 to inflate the air bag.

In other words, when shock having a magnitude larger than the larger threshold value acts on the vehicle, the air bag for the assistant driver's seat is inflated as well as the air bag for the driver's seat, irrespective of whether or not there is an occupant seated on the assistant driver's seat. The air bag for the assistant driver's seat is designed such that it covers the whole area of the windshield when it is inflated, so that the occupant on the driver's seat is more safely protected.

Although, in the above described embodiment, an electric deceleration sensor is used as the deceleration sensor, this is not limitative, but two mechanical deceleration/acceleration sensors may be used, which operate upon occurrence of shocks having two different magnitudes corresponding respectively to two threshold values of voltage supplied to the comparators 2e, 2d. Even the use of each mechanical sensors can provide the same effects as provided by the above described embodiment.

What is claimed is:

1. An occupant protective system for an automotive vehicle having a driver's seat and an assistant driver's seat, comprising:
    a first air bag provided in front of said driver's seat of said vehicle;
    a second air bag provided in front of said assistant driver's seat;
    deceleration detecting means for detecting a magnitude of deceleration exerted on said vehicle;
    occupant detecting means for detecting whether or not there is an occupant seated on said assistant driver's seat; and
    actuator means responsive to an output from said occupant detecting means for causing at least said first air bag to be inflated to absorb shock, when said magnitude of deceleration detected by said deceleration detecting means exceeds a predetermined value,
    wherein said actuator means comprises:
    comparison means for comparing said magnitude of deceleration detected by said deceleration detecting means with first and second threshold values forming said predetermined value, said second threshold value being greater than said first threshold value; and selecting means responsive to outputs from said comparison means which compares said detected deceleration magnitude with said predetermined value and responsive to said occupant detecting means for causing both of said first and second air bags to be inflated even when no occupant is seated on said assistant driver's seat, if said magnitude of deceleration detected exceeds said second threshold value, and for causing said first air bag alone to be inflated when no occupant is seated on said assistant driver's seat, if said magnitude of deceleration detected exceeds said first threshold value and does not exceed said second threshold value.

2. An occupant protective system as claimed in claim 1, wherein said comparison means comprises a first comparator for comparing said magnitude of deceleration detected with said first threshold value, and a second comparator for comparing said magnitude of deceleration detected with said second threshold value, and said selecting means comprises an AND circuit having one input supplied with an output from said first comparator and another input supplied with an output from said occupant detecting means, and an OR circuit having one input supplied with an output from said second comparator and another input supplied with an output from said AND circuit.

3. An occupant protective system as claimed in claim 2, wherein said occupant detecting means has a switch provided at said assistant driver's seat for detecting an occupant seated thereon.

* * * * *